United States Patent [19]
Tung

[11] 3,934,065
[45] Jan. 20, 1976

[54] RETROREFLECTIVE SHEET MATERIAL

[75] Inventor: Chi Fang Tung, Mahtomedi, Minn.

[73] Assignee: Minnesota Mining and Manufacturing Company, St. Paul, Minn.

[22] Filed: Aug. 1, 1973

[21] Appl. No.: 384,703

[52] U.S. Cl. .................. 428/241; 40/135; 350/105; 350/109; 428/256; 428/245; 428/402
[51] Int. Cl.² .......................................... B44F 1/00
[58] Field of Search ........... 161/1, 3.5, DIG. 5, 410, 161/4, 45, 89, 92, 91; 428/256, 241, 245, 428/402; 40/135, 134, 130 B; 350/105, 109

[56] References Cited
UNITED STATES PATENTS

| | | | |
|---|---|---|---|
| 2,586,017 | 2/1952 | Freedman | 161/6 |
| 2,624,967 | 1/1953 | Phillipi | 40/135 |
| 2,937,668 | 5/1960 | Carey, Jr. et al. | 161/91 |
| 2,957,444 | 10/1960 | Boettler | 350/105 |
| 3,042,561 | 7/1962 | Iwashita | 161/89 |
| 3,297,461 | 1/1967 | Siddall | 428/256 |
| 3,790,431 | 2/1974 | Tung | 161/3.5 |

*Primary Examiner*—Ralph S. Kendall
*Assistant Examiner*—Edith R. Buffalow
*Attorney, Agent, or Firm*—Alexander, Sell, Steldt & DeLaHunt

[57] ABSTRACT

A new retroreflective sheet material is taught that comprises a light-transmissive retroreflective open web of filaments that are individually encased by a monolayer of minute retroreflective microspheres, the web being ensheathed within an envelope that comprises two overlaid sheets joined together around the edge of the envelope, at least one of the sheets being transparent.

7 Claims, 4 Drawing Figures

RETROREFLECTIVE SHEET MATERIAL

The present invention provides a new kind of selfsupporting, wet-or-dry-reflecting, retroreflective sheet material of good "angularity" (capable of retroreflecting light that strikes it at a small angle with respect to the plane of the sheet material). Because it is self-supporting, this new sheet material may be used by itself—for example, as a self-supporting sleeving shaped to be mounted over other articles to make the articles retroreflective—and it also may be used as a basic structural unit in other retroreflective articles. Its ability to reflect under either wet or dry conditions means that the new sheet material may be used in a wide variety of exterior or interior uses; and its good angularity further broadens its usefulness. In preferred embodiments, the new sheet material is resilient and flexible, providing a wide latitude in handling conditions for the material.

Briefly, this new retroreflective sheet material comprises (a) an envelope that comprises two overlaid sheets joined together around the edge of the envelope, at least one of the sheets being transparent, and (b) a light-transmissive retroreflective open web of filaments ensheathed within the envelope, the filaments being encased around their whole circumference at least over those parts of their length that define open spaces of the web by a monolayer of minute retroreflective microspheres.

The utility of a retroreflective sheet material of the invention can be illustrated by reference to the traffic cones used to mark or segregate part of a roadway. In the past there have been proposals to reflectorize such traffic cones by coating them with a reflective paint or by adhering a conventional reflective sheeting to them. But none of these suggestions has provided a commercial long-lived traffic cone that is brightly retroreflective over its whole circumference under either wet or dry conditions.

According to the present invention a self-supporting retroreflective conical sleeve is applied over traffic cones to convert them to a retroreflective cone. The sleeve can be applied over both existing and newly made traffic cones, and it will make a durable, brightly retroreflective marker. By coloring one of the sheets of the envelope, the conical sleeve can be readily given a desired color, such as the construction orange or fluorescent red recently accepted as standard colors for warning devices by the Federal Highway Administration.

DETAILED DESCRIPTION

Figure 1:
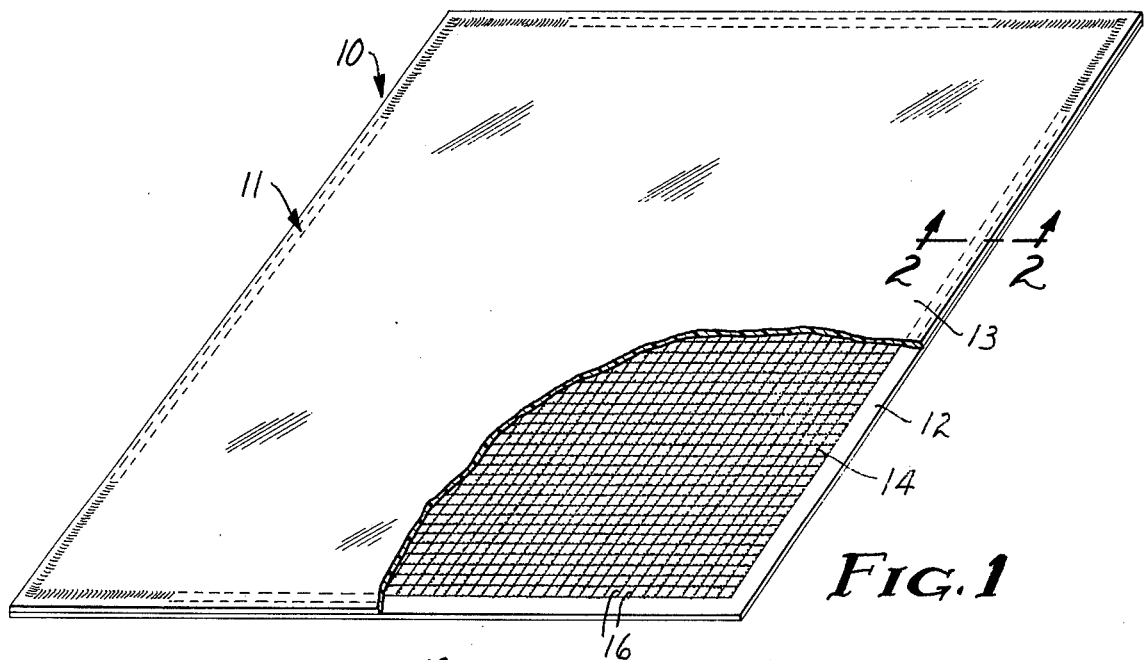
FIG. 1 is a perspective view of a retroreflective sheet material of the invention.
Figure 2:
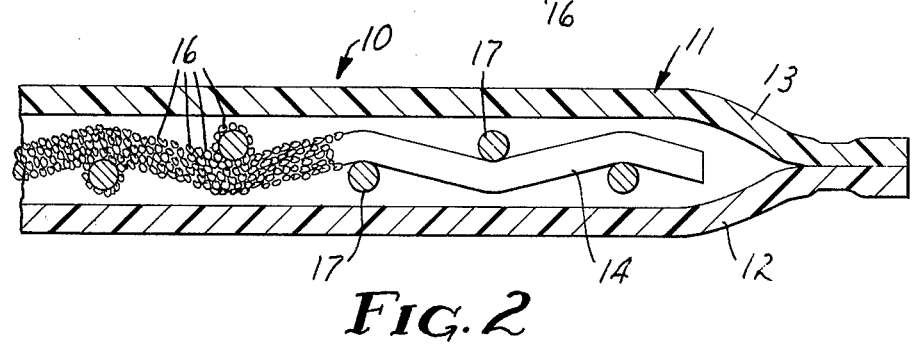
FIG. 2 is an enlarged section taken along the lines 2—2 of FIG. 1, shown with the layer of microspheres broken away to reveal the base fabric.

The illustrative retroreflective sheet material 10 of the invention shown in FIGS. 1 and 2 comprises an envelope 11 formed from two overlaid sheets 12 and 13 joined together at their edges, and an open-mesh retroreflective fabric 14 ensheathed within the envelope. The two sheets 12 and 13 need not be separate, but may be one piece of material folded to form two overlaid sheets. Preferably, the sheets 12 and 13 are joined around their whole periphery to provide environmental stability for the sheet material. At least one of the sheets 12 and 13 is transparent, and for most uses, both sheets are transparent. The sheets may be colored or carry various kinds of graphic information.

In the embodiment shown in FIGS. 1 and 2, the sheets 12 and 13 are polymer-based sheets heat-sealed around their edges. Some alternative means for joining the edges of the sheets include use of a layer of adhesive between the sheets; use of adhesive tape disposed between the sheets or folded over the edges; and use of a frame structure around the periphery of the envelope. Preferred polymer-based materials for making the sheets of the envelope include polyvinyl chloride, which have a desired flexibility and durability. Other useful polymeric materials include polycarbonates and polyvinylfluorides. Generally the polymer-based sheets are between 1 and 100 mils thick, and preferably are between 2 and 50 mils thick. For most uses the overlaid sheets are flexible and supple, so that, for example, the retroreflective sheet material may be wound in a tight roll. However, in some embodiments of the invention, one or both of the overlaid sheets of the envelope are rigid, as when glass or metal sheets are used.

The web 14 of filaments fits loosely enough within the envelope 11 so that, as shown in FIG. 2, there is generally an air space between almost all the microspheres 16 on the filaments 17 of the web and the envelope. Microspheres having an index of refraction such that they are retroreflective when their back surface is covered with a specular reflective means and their front surface is exposed to air are generally chosen for the web of filaments, and accordingly substantially all of the microspheres provide a bright retroreflection of light incident upon them. To assure even greater spacing between microspheres and the sheets of the envelope, the web of filaments may be provided with raised areas at spaced regular locations on the web.

Figure 3:
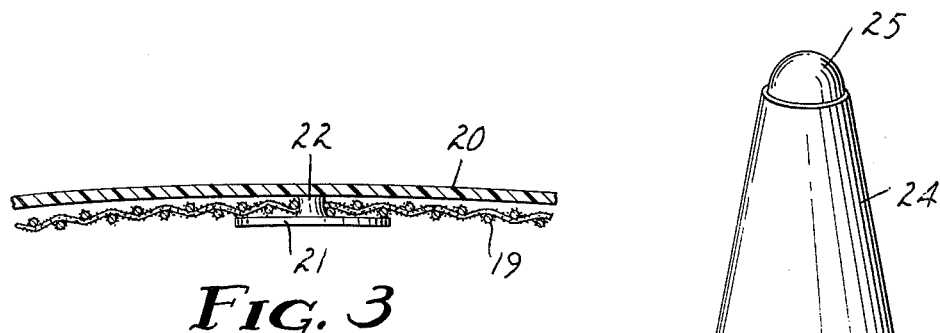
FIG. 3 is an enlarged section through one small part of a different retroreflective sheet material of the invention.

In some retroreflective sheet material of the invention the envelope is inflatable, having a nozzle in one of the overlaid sheets, for example, through which air is introduced under pressure into the envelope. Retroreflective sheet material of the invention having an inflatable envelope may be used as a cushion or as a floatable warning device. More than one retroreflective open web of filaments may be included in such inflatable retroreflective sheet material to assure that a retroreflective web is close to, or follows the contour of, each exterior sheet of the envelope. For example, as shown in FIG. 3, a web 19 of filaments may be held close to each sheet 20 of an envelope by a circular tab 21 that is heat-sealed to the sheet by a connection 22 that extends through an opening in the web.

The web 14 of microsphere-encased filaments in the illustrative embodiment of the invention shown in FIG. 1 is an open-mesh fabric, comprising filaments that are encased over those parts of their length that define the open spaces of the fabric by minute retroreflective microspheres. Such a fabric is shown in more detail in a copending application, Ser. No. 220,152, filed Jan. 24, 1972 now U.S. Pat. No. 3,790,431.

A typical method for preparing such a light-transmissive retroreflective fabric includes the steps of coating binder material onto a base woven fabric; applying microspheres completely covered with a reflective material, such as vapor-coated aluminum or chemically deposited silver, to the coated fabric while the binder material is in a tacky state so that the microspheres become partially embedded in the layer of binder material; drying or curing the binder material to advance it to a nontacky durable adherent condition; and removing the layer of reflective material that covers the exposed surfaces of the microspheres, as by etching. Retroreflective sheeting can also be prepared by weaving or otherwise grouping into an integral whole a web of filaments that have been previously coated with retroreflective elements, but such a method is much more difficult than preparing the light-transmissive retroreflective fabric from an already-prepared base fabric, and such precoated filaments cause substantial wear on weaving equipment. Also, instead of being woven as a fabric, only parallel filaments supported in an exterior frame may be used as the retroreflective sheeting of the invention.

The filaments in a fabric of the invention are made from a variety of materials, such as natural cellulose-based fibers, synthetic polymeric fibers, or metal filaments. And they are sometimes made of a material that can be heat-formed whereby the fabric is given a nonplanar configuration. Such a configuration is useful, for example, when a retroreflective sheet material of the invention is to be given a three-dimensional form. In some embodiments, the filaments are electrical conductors that generate heat when carrying a current, making the sheeting useful to keep the retroreflective sheet material of the invention warm and free from condensation.

The binder material on a light-transmissive retroreflective sheeting included in sheet materials of the invention is preferably elastomeric, which among other advantages gives the sheeting a flexibility that facilitates its use and handling. One such useful elastomer-forming binder material comprises a polyether polyamine of high amine functionality, such as poly(tetramethyleneoxide)diamine taught in Hubin et al., U.S. Pat. No. 3,436,359 and diglycidyl ether of bisphenol A. This material cures to form a very strong bond with partially embedded silver- or aluminum-coated glass microspheres. Other useful binder materials include natural rubber, acrylic resin, and polyvinyl butyral resin.

The light-transmissive retroreflective sheeting is designed to provide a desired balance of transmission and reflection. Preferably the light-transmissive retroreflective sheeting transmits at least 20% and more preferably at least 40%, of the light impinging on the sheeting from a light source. On the other hand, so that the light-transmissive retroreflective sheeting will provide good retroreflection, the light-transmissive retroreflective sheeting preferably transmits no more than 80% and more preferably no more than 60% of the light from such a light source (the percent transmission numbers are assumed to describe the percent open area occupied by the sheeting, and nontransmitting portions of the sheeting are assumed to be retroreflective). Adequate light-transmission and reflection can also be obtained with sheeting having a percentage of open area outside these ranges; for example, a sheeting transmitting as little as 5% of the light impinging on it may be used, and sheeting transmitting as much as 90 or 95% of light has useful reflection characteristics.

Also a light-transmissive retroreflective sheeting is least noticeable when light-transmissive-spaces in the densely packed areas of microspheres are very fine or small. Thus, a light-transmissive retroreflective fabric is least noticeable when the diameter of the retroreflective-microshpere-encased filaments is less than one millimeter and preferably less than 500 microns or even 250 microns, and the smallest dimension of the spaces between the encased filaments is less than 5 millimeters and preferably less than one millimeter or even 500 microns. The glass microspheres are of a size such that a dense monolayer of them can be coated on the filament without unduly reducing the size of the spaces between the filaments.

Preparation of an open-mesh retroreflective fabric useful in the invention will be illustrated by the following example. A fabric of 200-micron-diameter nylon filaments woven in a straight "Leno" weave using 20 threads per inch was first roll-coated with a primer to fill up all crevices in the filament. The primer material was a 10-weight-percent-solids solution in toluene of the following ingredients:

| | Parts by Weight |
|---|---|
| Poly(tetramethyleneoxide)diamine that has a number-average molecular weight of 10,000, an amine equivalent weight of 4610, and a viscosity at 65°C of 49,500 centipoises, and that was prepared according to the procedures of Examples 1–4 of Hubin et al, U.S. Pat. 3,436,359 | 100 |
| 2,4,6-tris-dimethylaminomethylphenyl catalyst (DMP-30) | 2.5 |
| Diglycidyl ether of bisphenol A having an epoxide equivalent weight of 180–195 (Epon 828) | 50 |
| Stannous octoate catalyst | 5 |

This primer coating was then cured at 150°F for 30 minutes. After the fabric had cooled to room temperature, a binder material of the same ingredients listed above but dissolved at 30-weight-percent solids in toluene was coated on the fabric, after which the coated fabric was exposed to jets of compressed air to remove excess binder material and keep the spaces between filaments open. While the layer of binder material was still wet and tacky, the fabric was passed through a "fluidized bed" of aluminum-vapor-coated glass microspheres 37 to 88 microns in diameter (the fabric passed over a trough containing microspheres that were shot upward by a set of compressed air nozzles at the bottom of the trough, with a canopy above the fabric returning the microspheres toward the fabric), whereupon the filaments of the fabric became individually encased by a densely packed monolayer of microspheres adhered to and partially embedded in the coating of binder material. The layer of binder material was then cured at 150°F for 1 hour, after which the aluminum on the exposed portions of the microspheres was removed by etching with an alkali solution.

The resulting light-transmissive retroreflective sheeting had an open area of about 50 percent (determined by measuring the light in photovolt units (PV) returned by an assembly that comprised the sheeting before the aluminum was removed (which is known to have a PV of zero) over a standard sheeting known to have a PV of 57 using a photometer that had been calibrated with the standard 57 PV sheeting; the assembly was measured as having a PV of 30, meaning that the percent open area of the light-transmissive sheeting of this example was 30/57 times 100, or about 50 percent).

A sample of this fabric was then laid between two transparent 10-mil-thick polyvinyl chloride sheets, and the edges of the sheets were heat-sealed by pressing the edges between two narrow metal bars that were electrically connected to a source of electric power so as to apply an electric potential across the sheets; the resulting electric current through the sheets heated the sheets and caused them to be welded together.

Figure 4:
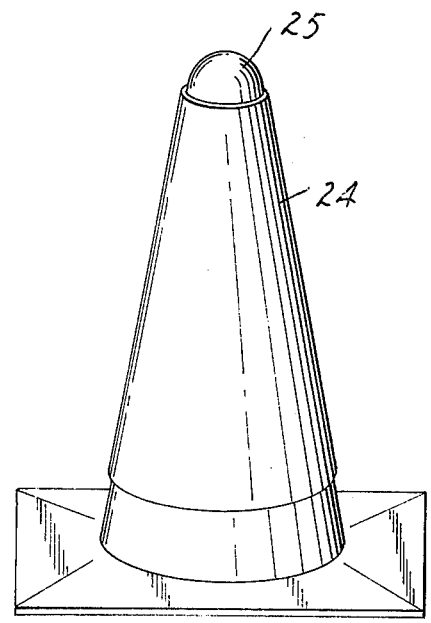
FIG. 4 is a perspective view of a traffic cone on which is mounted a conical sleeve formed from retroreflective sheet material of the invention.

Retroreflective sheet material of the invention can be fabricated into a variety of forms. For example, the sheet material may be formed into a conical sleeve 24 that may be mounted on a traffic cone 25 as shown in FIG. 4. Alternatively the retroreflective sheet material is formed into a self-contained article, such as a retroreflective belt to be worn by a person. In another form, retroreflective sheet material of the invention is used as a dangle card suspended from a person's apparel, for example, to call attention to the person when he walks along a roadway at night. In other embodiments, retroreflective sheet material of the invention is adhered to a base substrate. In all these uses the retroreflective sheet material generally has high "angularity"; for example, some retroreflective sheet material of the invention can retroreflect with 50% of original brightness, light striking the sheet material at an angle of 70°-80° to the normal of the sheeting.

What is claimed is:

1. Retroreflective sheet material capable of reflecting under wet or dry conditions comprising (a) an envelope that comprises two overlaid sheets joined together around the edge of the envelope, at least one of the sheets being transparent, and (b) at least one light-transmissive retroreflective open web of filaments ensheathed within the envelope, the filaments being encased around their whole circumference at least over those parts of their length that define open spaces of the web by a monolayer of minute retroreflective microspheres.

2. Sheet material of claim 1 in which the filaments are flexible and the microspheres are partially embedded in and held to the filaments by a layer of elastomeric binder material coated on the filaments.

3. Retroreflective sheet material capable of reflecting under wet or dry conditions comprising (a) an envelope that comprises two supple overlaid polymer-based sheets joined together around the edge of the envelope, at least one of the sheets being transparent, and (b) at least one light-transmissive retroreflective open-mesh fabric ensheathed within the envelope, the fabric comprising interwoven filaments that are encased around their whole circumference over those parts of their length that define the open meshes of the fabric by a monolayer of minute retroreflective microspheres partially embedded in a layer of binder material that is coated on the filaments after the filaments have been woven into a fabric; the embedded surfaces of the microspheres being covered by specularly reflective means.

4. Sheet material of claim 3 in which both sheets of the envelope are transparent.

5. Sheet material of claim 3 in which the sheets of the envelope comprise a vinyl chloride polymer.

6. Retroreflective sheet material of claim 3 in which the spaces between the microsphere-encased filaments occupy between 20 and 80 percent of the area occupied by the sheeting.

7. Retroreflective sheet material capable of reflecting under wet or dry conditions comprising (a) an envelope that comprises two transparent supple overlaid polymer-based sheets heat-sealed together around the edge of the envelope, and (b) an open-mesh fabric ensheathed within the envelope, the fabric comprising interwoven flexible filaments that are encased around their whole circumference over those parts of their length that define the open meshes of the fabric by a monolayer of minute retroreflective microspheres partially embedded in a layer of elastomeric material that is coated on the filaments after the filaments have been woven into a fabric; the embedded surfaces of the microspheres being covered by specularly reflective means, and the spaces between the microsphere-encased filaments occupying between 20 and 80 percent of the area occupied by the fabric.

* * * * *